United States Patent [19]

Ohler

[11] Patent Number: 4,640,470
[45] Date of Patent: Feb. 3, 1987

[54] MAGNETICALLY ACTUATED LINE FEATHERING SYSTEM FOR SPIN CAST REELS

[75] Inventor: Steven W. Ohler, Cincinnati, Ohio
[73] Assignee: Brunswick Corporation, Skokie, Ill.
[21] Appl. No.: 720,604
[22] Filed: Apr. 5, 1985
[51] Int. Cl.[4] ............................................. A01K 89/01
[52] U.S. Cl. .............................................. 242/84.2 A
[58] Field of Search ...................... 242/84.2 A, 84.2 R, 242/84.21 A, 84.21 R

[56] References Cited

U.S. PATENT DOCUMENTS

| | | | |
|---|---|---|---|
| 2,648,505 | 8/1953 | Mauborgne | 242/84.21 R |
| 2,675,192 | 4/1954 | Hull | 242/84.2 A |
| 2,854,200 | 9/1958 | Montgomery | 242/84.2 A |
| 2,988,298 | 6/1961 | Purnell . | |
| 3,028,115 | 4/1962 | Hammer . | |
| 3,176,930 | 4/1965 | Miller et al. | 242/84.2 A |
| 3,284,018 | 11/1966 | Wood | 242/84.2 A |
| 3,481,554 | 12/1969 | Hull . | |
| 4,101,087 | 7/1978 | Harre . | |
| 4,386,743 | 6/1983 | Moss . | |

*Primary Examiner*—Billy S. Taylor
*Attorney, Agent, or Firm*—Wood, Dalton, Phillips, Mason & Rowe

[57] ABSTRACT

The invention is incorporated into a reel of the type having a reel housing with a deck plate, a line carrying spool and spinner head assembly mounted forwardly of the deck plate. According to the invention, a feathering element is mounted forwardly of an adjustably relative to the deck plate. Biasing structure urges the feathering element away from the spinner head assembly. An adjustable actuating button urges the feathering element against the bias force toward the spinner head assembly so that the line is trapped between the feathering element and spinner head assembly. The feathering structure is located primarily rearwardly of the spinner head assembly so that the structure is independent of the normal reel structure, yet compact.

17 Claims, 5 Drawing Figures

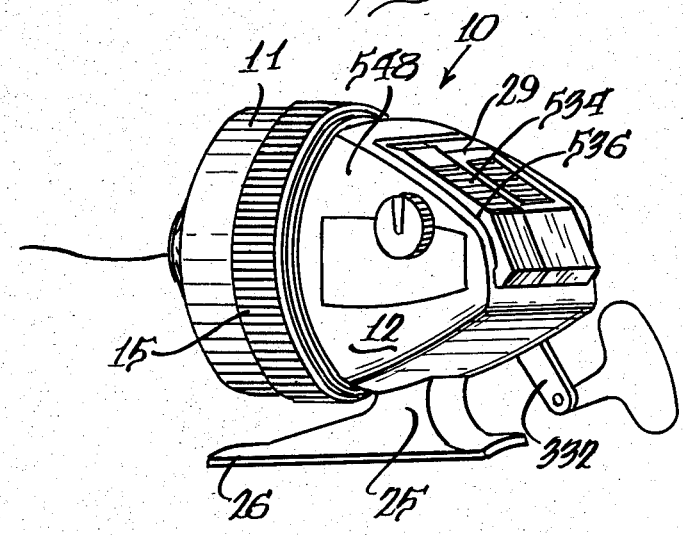
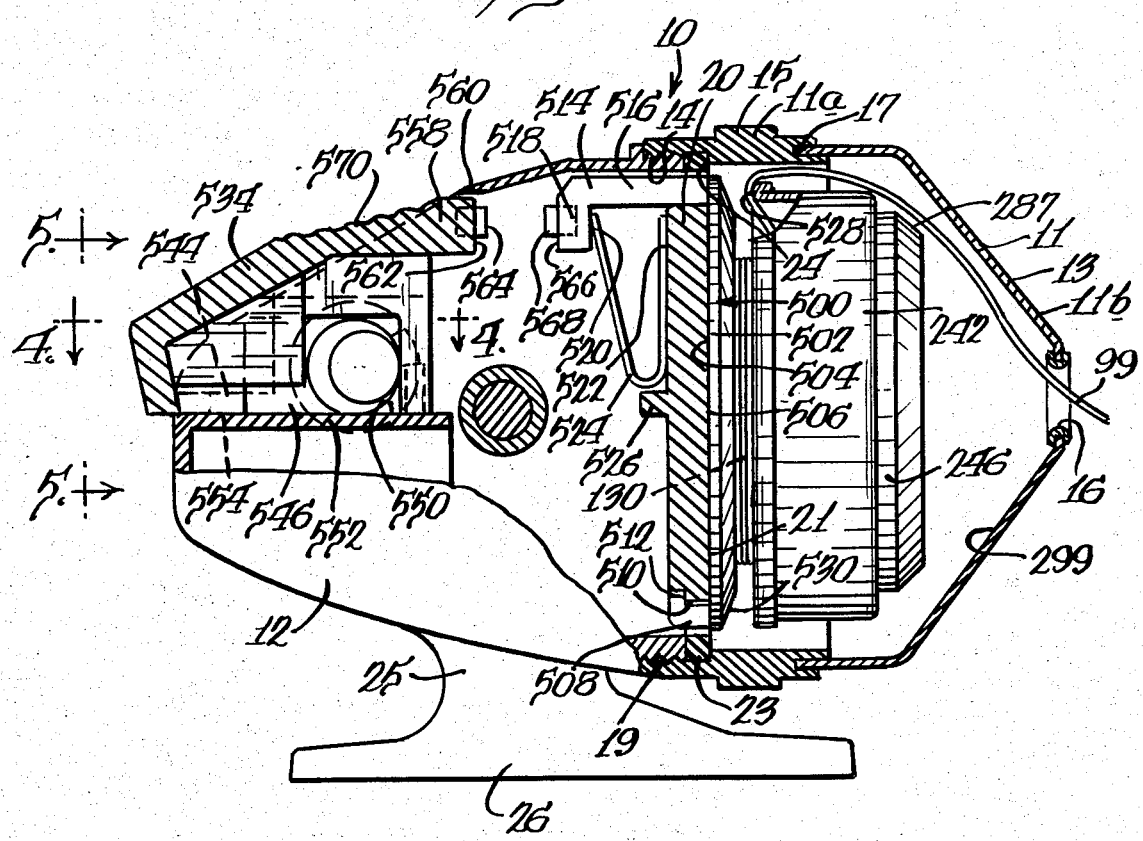

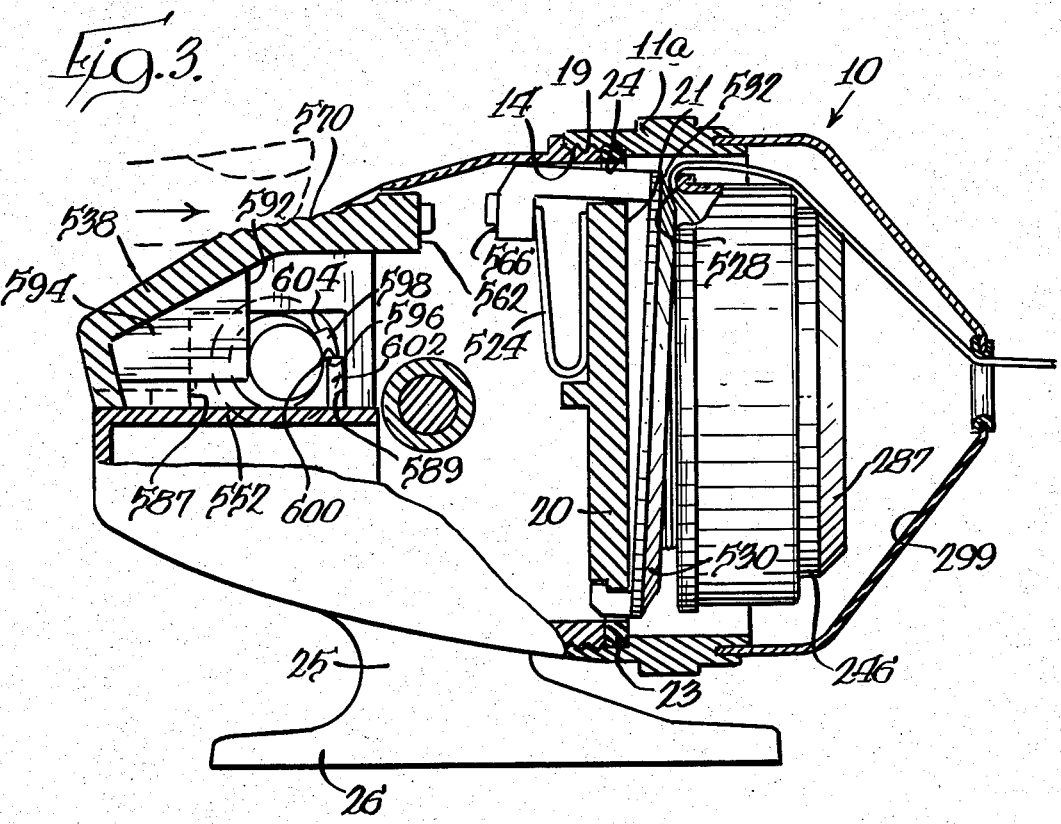
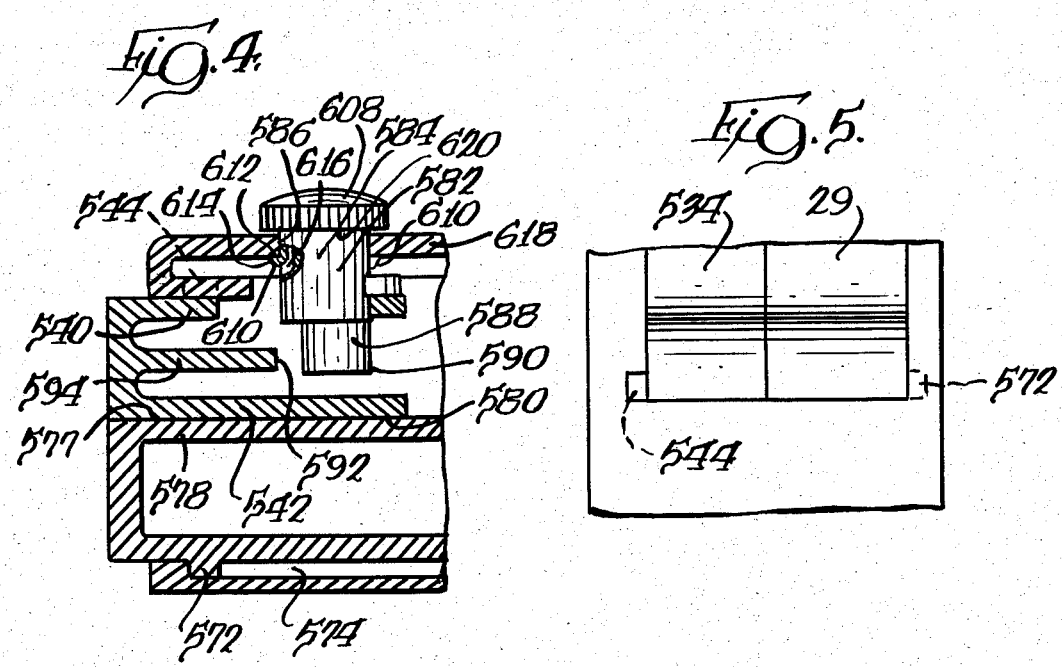

MAGNETICALLY ACTUATED LINE FEATHERING SYSTEM FOR SPIN CAST REELS

BACKGROUND OF THE INVENTION

1. Field of the Invention

This invention relates to line feathering structure associated with spin cast reels and, more particularly, to magnetically actuated feathering structure which traps line against the spinner head assembly.

2. Background Art

It is known to incorporate line feathering structure in spin cast reels to allow precise placement of a bait through casting. A fisherman will normally thrust the bait with a greater force than that required to cause it to arrive at its intended target area. By feathering the line, payout can be retarded to guide the bait to the desired landing area. This precision is desirable, particularly to the skilled fisherman capable of identifying stumps, rocks and other areas likely to attract fish.

A skilled fisherman can utilize conventional spin cast structure to effect feathering. With the line paying out, the thumb button can be depressed to bear the line braking surface against an inside surface of the front portion of the reel cover. This procedure demands a very delicate touch which can be achieved only through much practice. In the event that too much pressure is applied to the thumb button, the line is snubbed and payout is abruptly arrested, ruining the cast. The contact area normally between the line surface and the inside surface of the cover is substantial so that very light feathering is difficult to achieve.

One known structure shown in U.S. Pat. No. 3,481,554, to Hull, bears a ring against the annular, rear edge of the spinner head assembly to snub the line at the beginning of a cast. Because of the annular contact area established between the ring and spinner head assembly, the line is continuously confined, making light feathering difficult, if not impossible.

Another problem associated with conventional feathering structure is that normally the connection between the actuator and the feathering structure is inflexible. As a result, the line may tend to hang up and may pay out in a jerking fashion during feathering or payout may be halted altogether, all of which situations are undesirable.

Conventional reels do not lend themselves to incorporation of separate line feathering structure. It is conventional to urge the line against the inside surface of the front reel cover to effect feathering, yet the feathering actuator resides remotely at the rear of the reel. Thus, structure interconnecting the actuator and the structure encountering the inside reel surface would extend through the length of the reel and take up substantial space, which is at a premium.

SUMMARY OF THE INVENTION

The present invention is specifically directed to overcoming the above deficiencies known in the prior art in a novel and simple manner.

The invention is incorporated into a reel of the type having a reel body with a deck plate, a line carrying spool and a spinner head assembly mounted forwardly of the deck plate. According to the invention, a feathering element is mounted forwardly of and adjustably relative to the deck plate. Biasing structure urges the feathering element away from the spinner head assembly. An adjustable actuating button urges the feathering element against the bias force toward the spinner head assembly to trap the line between the feathering element and a portion of the spinner head assembly. Because feathering structure is located rearwardly of the spinner head assembly, the feathering structure can be compactly constructed independently of the main reel structure.

Another aspect of the invention is the provision of magnetic actuating structure which, in conjunction with the biasing structure associated with the feathering element, cushions the feathering element so that feathering occurs smoothly without line jerking or braking. An adjustable button is mounted on the reel housing and has a magnet that is repelled by a magnet associated with the feathering element. By reducing the gap between the magnets, the magnetic repulsive force overcomes the bias to engage the feathering element with the spinner head assembly. Any tendency of the line to snag will be reduced by the cushion afforded by the magnetic field and the biasing structure.

Another aspect of the invention is the provision of a cam member which can be adjusted to preselect the range of feathering upon actuation of the feathering button. The invention also contemplates the provision of a button that is operable independently of the thumb button normally associated with spin cast reels.

BRIEF DESCRIPTION OF THE DRAWINGS

FIG. 1 is a perspective view of a spin cast reel with the present invention incorporated;

FIG. 2 is a side elevation view of the reel of FIG. 1 in section with the reel in the retrieve mode;

FIG. 3 is a side elevation view of the reel in FIG. 1 in section with the reel in the feathering mode;

FIG. 4 is a fragmentary, sectional view of the feathering control structure along line 4—4 of FIG. 2; and FIG. 5 is a fragmentary view of a thumb button and feathering actuating button along line 5—5 of FIG. 2.

DETAILED DESCRIPTION OF THE DRAWINGS

FIGS. 1-3 illustrate a spin cast reel which is typical of a reel that is particularly adaptable to the present invention. The reel comprises a closed face housing 10 having a two-part, front, cup-shaped cover 11 and a rear, cup-shaped cover 12. The front cover 11 has a ring or cylindrically-shaped first part 11a and a cone-shaped second part 11b. The cone-shaped second part 11b has a generally annular, rearward edge portion engaging in a forwardly facing locking groove 17 formed in the first part 11a of the cover 11. The cone-shaped second part 11b of the cover 11 has a conical front portion 13 tapering forwardly to a circular line opening which mounts an annular line guide 16 in conventional manner. The rear cover 12 has an integrally molded, radially extending stem 25 with a mounting foot 26 on the outer end thereof for attachment appropriately to a fishing rod.

A reel body 20 is provided and has a circular mounting or deck plate 21 which has a flange 23 at the outer periphery thereof. The first part 11a of the front cover 11 is undercut to provide a rearwardly facing shoulder 24. To assemble the reel body and housing 10, the reel body is positioned so that the flange 23 bears against the shoulder 24 defined at the undercut portion of the first part 11a. The front and rear covers are engageable, one within the other by providing helical threads 14 on the rearmost internal surface of the first part 11a and mating threads 19 externally on the forward portion of the rear cover 12. The cover parts 11, 12 are threaded towards each other until the forwardly facing edge of the rear cover 12 engages the flange 23 to trap the reel body 20 between the front cover 11 and the rear cover 12. To assist the relative rotation of the front and rear covers, the first part 11a has knurled gripping portions 15 on its external surface.

The precise details of the overall reel are not critical to an understanding of the present invention. Additional detail of the reel operation can be understood by reviewing the description in U.S. Pat. No. 4,386,743, to Moss, which shows substantially the same, basic reel. In operating the reel, a cast is initiated by depressing a movable thumb button 29 which, through an intermediate center shaft (not shown) directs a spinner head assembly 242 with an annular body forwardly to bring a frusto-conical surface 287 of a braking ring 246 into facial engagement with an inside surface 299 on the conical front portion 13 of the front cover 11. With the line firmly snubbed, the back swing can be performed without releasing line. As the rod and bait is thrust forwardly, the thumb button 29 is simultaneously released. Releasing the thumb button maintains the spinner head assembly in a forward casting position (see FIG. 2), but allows retraction of the spinner head assembly sufficiently to unclamp the line so that the spinner head assembly does not interfere with the fishing line 99 which can be freely paid out from a spool assembly 130. Upon completion of the cast the operator turns a crank handle 332 which extends a pick-up pin (not shown) and reciprocatively rotates the spinner head assembly 242 to guidingly wind the line 99 on the spool assembly 130.

The invention offers an alternative to conventional feathering which, in an exemplary structure, is accomplished by applying light pressure on the thumb button 29 to bring the surface 287 into contact with the inside surface 299 of the front cover 11. Because facial engagement between the surface 287 and surface 299 is contemplated, application of too much pressure rapidly arrests line payout and makes light feathering difficult.

According to the invention, a feathering ring 500 is provided and located between the deck plate 21 and the spinner head assembly 242. The feathering ring 500 has a body 502 with a flat, rear surface 504 that, in a no-feathering mode (FIG. 2), flushly abuts the forwardly facing surface 506 of the deck plate 21. The ring 500 has a first, hook shaped leg 508 extended through a bore 510 in the deck plate 21. The leg 508 has a radially projecting portion which engages behind a rearwardly facing shoulder 512 defined by an undercut on the deck plate 21. The bore 510 and undercut are of such a dimension that the body 502 of the ring can pivot about the leg 508 away from the deck plate 21.

Diametrically opposite the first leg 508 is a second leg 514 integral with and extending rearwardly of the body 502 of the ring 500. The second leg has a first portion 516 extending substantially lengthwise of the reel and a free transverse portion 518 making a substantially right angle with the first portion 516. The transverse portion 518 forms a shoulder 520 facing forwardly of the reel and lying parallel with a rear surface 522 of the deck plate 21 in the no-feathering mode. A U-shaped leaf spring 524 has legs compressed between the shoulder 520 and the rear surface 522 and biases the feathering ring about the leg 508 toward the deck plate 21 as in FIG. 2. A stop lug 526 is integrally formed on the rear surface 522 of the deck plate and prohibits radial shifting of the leaf spring 524 as might precipitate its escape from the location shown in FIGS. 2 and 3.

Feathering is accomplished by urging the portion of the ring diametrically opposite the first leg 508, in the case of the illustrated construction the upper portion of the ring, forwardly against the rounded, rear, annular edge 528 of the spinner head assembly 242. By canting the ring against the bias afforded by the spring 524, a portion of a flat, frusto-conical, forwardly facing surface 530 is brought to bear against the rear edge 528. The line 99 paying out of the spool passes over the edge 528 and is thereby trapped by the ring portion 532 as demonstrated in FIG. 3. The amount of feathering is determined by the resultant force between the pivoting force applied to the ring 500 and the restoring force in the compressed spring 524.

The feathering ring is operated by a slide button 534 which together with button 29 fits in a substantially rectangular opening 536 in the rear cover 12. Reference should be made also to FIGS. 4 and 5, which show the details of the buttons 534, 29. The slide button 534 has an upper wall 538 configured to match the contour of the reel cover 12. Spaced side walls 540, 542 depend in substantially parallel relationship from the upper wall 538. The outer side wall 540 has an integral lug 544, which is guided in translation along an elongate slot 546 integrally defined in the side wall 548 of the reel housing 10. The lower boundary of the slot is defined by a flat, upper surface 550 of a partition 552, which surface 550 facially mates with and bears the flat underside 554 of lug 544. With the lug 544 in its rearwardmost position, the forward, upper region 558 of the slide button resides beneath and extends forwardly beyond the free edge 560 bounding the opening 536 so that the edge 560 obstructs escape as by pivoting of the slide button.

Feathering is accomplished by directing the slide button forwardly. At the forwardly facing edge 562 of the slide button a disc magnet 564 is embedded. At the rearwardly facing surface 566 of leg portion 518, a disc magnet 568 is embedded. The magnets 564, 568, have the same polarity so that they repel each other with increasing force as the gap between the magnets is diminished. High coercive force magnets such as cobalt magnets, or the like, are preferred for the magnets 564, 568.

To effect feathering, the operator applies a forward pressure on a ribbed, upper surface, 570 of the upper wall 538 of the slide button 534, shown in FIG. 3. By maintaining the forward pressure on the slide button, the repulsive force between the magnets 564, 568 shifts the upper region of the feathering ring against the bias of spring 524 and thereby cants the ring and brings the surface 530 close to or bearing against the rear edge 528 of the spinner head assembly. The feathering is in effect cushioned as there is a non-rigid connection between the slide button and the feathering ring. The magnetic force allows a certain amount of flexibility which thereby prevents hang up and accounts for smooth, continuous feathering.

The thumb button 29 is mounted slidably within the reel in a manner comparable to that for the slide button 29. A lug 572 moves guidingly within a straight slot 574 in a fore and aft direction. The slot 574 is open at its rearward portion to allow introduction of the thumb button from the rear of the reel.

To assemble the buttons, the slide button is initially introduced through the rectangular housing opening 536. The width of the opening 536 allows the button 534 to be directed forwardly therethrough and then displaced laterally to seat the lug 544 in its guide slot 546. With the slide button in operative position, the assembler can either hand hold the button in position or the reel may be tipped to its side to keep the button 534 properly located. The thumb button is then assembled by introducing the lug 572 at the rear of the slot 574 and directing the thumb button 29 forwardly. An inside surface 577 of a depending wall 578 on button 29 facially abuts a surface 580 on the side wall 542 of the slide button 534. The flat surfaces 580, 577 are slidable, one over the other, to facilitate positioning of the thumb button and to allow guided, independent operation of either button relative to the other. With the thumb button in position, the close mating of the faces 580, 577 prevents lateral shifting of either button 534, 29, that might allow the escape of the lugs 544, 572 from their respective slots 546, 574. The magnetic repulsion urges the slide button towards its rearwardmost position and thereby eliminates rattling within the housing. The center shaft (not shown) biases the thumb button 29 rearwardly to accomplish the same purpose.

To limit rearward shifting of the slide button 534, a cam member 582 is provided. The cam member 582 has a body 584, which is accepted rotatably in a bore 586 in the reel housing and is directed through a rectangular opening in the button 534 that is bounded by a rear vertical edge 587 and a front vertical edge 589. The edges 587, 589 interfere with the cam member body 584 and respectively determine the limits of forward and rearward shifting of the slide button 534.

Radially offset from the axes of the body and bore is an extension 588. The extension 588 has an outer surface 590 which abuts a forward stop edge 592 on a depending wall 594 associated with the button 534 and residing approximately midway between the sidewalls 540, 542. The heaviest feathering setting is demonstrated in FIG. 3. This position can be detected when a surface 596 of a boss 598 on the cam member 582 encounters the upper edge 600 of an upright stop 602 on the partition 552. Rotation of the cam member in a counterclockwise direction in FIG. 3 presents boss surface 604 at the surface 550 on the partition. In this position, the cam surface is situated rearwardly of the FIG. 3 position so that the thumb button cannot go as far forward as it does in FIG. 3. This is the minimum feathering position. To facilitate adjustment of feathering range between the extreme positions, an enlarged head 608 is formed on the body 584 and is manipulable externally of the reel.

To maintain the cam member in operative relationship with the housing, a pair of resilient legs 610 are provided at diametrically opposite portions of the body. The legs each have a laterally outwardly facing shoulder 612 and a ramped edge 614 which deflects the legs into a recess 616 in the body and allows insertion of the body through the reel housing. By simply press fitting the cam member, the legs first deflect and then reassume their original state, so that the housing wall 618 is maintained captive between the surface 620 of the head 608 and the shoulder 612 on the legs 610.

It should be understood that the foregoing detailed description was made for purposes of demonstrating the structure and operation of the invention, with no unnecessary limitations to be understood therefrom.

I claim:

1. In a fishing reel of the type having a housing, a reel body with a deck plate, a line-carrying spool, a spinner head assembly mounted forwardly of the deck plate and means for operating the spinner head assembly to direct line onto the spool during line retrieval, line feathering structure comprising:
    a feathering element;
    means mounting the feathering element movably relative to the deck plate; and
    means for directing at least a portion of the feathering element towards the spinner head assembly so that the line can be trapped between the feathering element and the spinner head assembly during a cast,
    said means for directing the feathering element towards the spinner head assembly comprising a button on the reel and magnetic means on each of the feathering element and button, said magnetic means on the feathering element and button being mutually repulsed by a magnetic force so that the feathering element is biased towards the spinner head assembly by said magnetic force.

2. The feathering structure according to claim 1 wherein said spool is rotatable about a first axis, the means movably mounting the feathering element comprises a leg integral with the feathering element, means pivotally mounting the leg to the reel body for movement about a second axis that is transverse to the first axis and spring means biasing the portion of the feathering element away from the spinner head assembly.

3. In a fishing reel of the type having a housing, a reel body with a deck plate, a line-carrying spool, a spinner head assembly mounted forwardly of the deck plate and means for operating the spinner head assembly to direct line onto the spool during line retrieval, line feathering structure comprising:
    a feathering element;
    means mounting the feathering element adjustably relative to the deck plate; and
    means for directing at least a portion of the feathering element towards the spinner head assembly and establishing a non-annular contact area between the feathering element and spinner head so that the line can be trapped between the feathering element and the spinner head assembly during a cast,
    wherein the means for directing the feathering element towards the spinner head assembly comprises a button on the reel and magnetic means on each of the feathering element and button, said magnetic means on the feathering element and button being mutually repulsive, said button adjustable to a feathering position whereupon the magnetic means on the button is directed towards the magnetic means on the feathering element thereby urging the feathering element towards the spinner head assembly.

4. The feathering structure of claim 1 wherein said reel has a first thumb button for shifting the spinner head assembly relative to the housing, said means for directing the feathering element comprises a slide button that is separate from the first thumb button and at least one slot for guiding translation of the slide button relative to the reel housing and a member extends through the reel housing and limits rearward, translatory movement of the slide button.

5. In a fishing reel of the type having a housing, a reel body with a deck plate, a line-carrying spool, a spinner head assembly mounted forwardly of the deck plate and means for operating the spinner head assembly to direct line onto the spool during line retrieval, line feathering structure comprising:

a feathering element;

means mounting the feathering element adjustably relative to the deck plate;

means for directing at least a portion of the feathering element towards the spinner head assembly and establishing a non-annular contact area between the feathering element and spinner head so that the line can be trapped between the feathering element and the spinner head assembly during a cast; and means are provided on the reel to selectively set the amount of feathering that can be effected through the means directing the feathering element towards the spinner head assembly.

6. The feathering structure of claim 3 wherein said means adjustably mounting the button comprises a lug on one of either the button or housing and an elongate slide on the other of either the button or housing whereby guided, translatory movement of the button occurs.

7. In a fishing reel of the type having a housing, a reel body with a deck plate, a line-carrying spool, a spinner head assembly mounted forwardly of the deck plate and means for operating the spinner head assembly to direct line onto the spool during line retrieval, line feathering structure comprising:

a feathering ring having a body with a forwardly facing edge and an associated first magnetic means;

a first leg integral with and extending rearwardly of the ring body;

means engaging the first leg with the reel body so that the feathering ring can be adjustably canted to bear at least a portion of the forward edge against the spinner head assembly to effect line feathering;

means biasing the portion of the edge away from the spinner head with a predetermined force towards a no-feathering position; and a button having a second magnetic means that is spaced from the first magnetic means, said first and second magnetic means being mutually repulsed by a magnetic force that is greater than the predetermined biasing force so that the portion of the edge is urged against the spinner head assembly by a force equal to the difference between the magnetic force and the predetermined biasing force.

8. The fishing reel of claim 7 wherein said spinner head assembly has a rearwardly facing annular edge, and the means bearing the portion of the ring edge against the spinner head assembly bears the portion of the ring edge on the edge of the spinner head assembly.

9. The fishing reel of claim 7 wherein said feathering ring has a forwardly facing shoulder rearwardly of the deck plate and said biasing means comprises a resilient member captured between said shoulder and the reel body.

10. In a fishing reel of the type having a housing, a reel body with a deck plate, a line-carrying spool, a spinner head assembly mounted forwardly of the deck plate and means for operating the spinner head assembly to direct line onto the spool during line retrieval, line feathering structure comprising:

a feathering ring having a body with a forwardly facing edge;

a first leg integral with and extending rearwardly of the ring body; and means engaging the first leg with the reel body so that the feathering ring can be adjustably canted to bear at least a portion of the forward edge against the spinner head assembly to effect line feathering;

means biasing the portion of the edge away from the spinner head to a no-feathering position;

means for selectively bearing the portion of the edge against the spinner head assembly; and means are provided on the reel to selectively set the amount of feathering that can be effected through the means bearing the ring edge portion against the spinner head assembly.

11. The fishing reel of claim 7 wherein said feathering ring has a forward, tapered surface defining said edge.

12. In a fishing reel of the type having a housing, a reel body with a deck plate, a line-carrying spool, a spinner head assembly mounted forwardly of the deck plate and means for operating the spinner head assembly to direct line onto the spool during line retrieval, line feathering structure comprising:

a feathering ring having a body with a forwardly facing edge;

a first leg integral with and extending rearwardly of the ring body; and means engaging the first leg with the reel body so that the feathering ring can be adjustably canted to bear at least a portion of the forward edge against the spinner head assembly to effect line feathering;

means biasing the portion of the edge away from the spinner head to a no-feathering position; and means for selectively bearing the portion of the edge against the spinner head assembly, wherein the means for bearing the ring edge portion against the spinner head assembly comprises a manually adjustable button and magnetic means on each of the button and feathering ring, said magnetic means on the button and feathering ring being spaced and mutually repulsive, and means are provided for adjusting the spacing between the magnetic means on the feathering ring and the button for limiting the urging of the ring towards the spinner head assembly thereby limiting the feathering of the line.

13. The fishing reel of claim 7 wherein means are provided for guiding translation of the slide button relative to the reel housing to thereby vary the spacing between the first and second magnetic means to vary the magnetic force.

14. The fishing reel according to claim 10 wherein the means for limiting the feathering comprises a cam member with a cam surface, means for mounting the cam member rotatably within the reel housing, said means for bearing the ring edge against the spinner head assembly comprises a button adjustably mounted on the reel housing, said button having a portion engageable with the cam surface to limit adjusting movement of the button and preselect the limit of line feathering, said cam member rotatable to reorient the cam surface and alter said preselected limit of feathering.

15. The fishing reel according to claim 13 wherein a thumb button is provided for axially shifting the spinner head assembly, a slot is provided for guiding translatory movement of the thumb button, means are provided to block rearward translation of the thumb button at a predetermined position and entry means are provided to allow introduction of the slide button with the thumb button in operative position.

16. The fishing reel according to claim 14 wherein said cam member comprises a body extending coaxially through a bore in the housing, a head integral with the body and manipulable externally of the housing and an extension offset from the axes of the cam member body and bore and defining said cam surface.

17. The fishing reel according to claim 15 and a member extends through the reel housing with both the thumb button and slide button in place and prevents escape of the slide button from the reel.

* * * * *